US007574488B2

(12) United States Patent
Matsubara

(10) Patent No.: US 7,574,488 B2

(45) Date of Patent: Aug. 11, 2009

(54) METHOD AND APPARATUS FOR PEER-TO-PEER FILE SHARING

(75) Inventor: Daisuke Matsubara, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 489 days.

(21) Appl. No.: 10/159,144

(22) Filed: May 31, 2002

(65) Prior Publication Data

US 2003/0225796 A1 Dec. 4, 2003

(51) Int. Cl.
*G06F 15/16* (2006.01)

(52) U.S. Cl. ...................................... 709/219; 709/222

(58) Field of Classification Search ................ 709/203, 709/204, 208, 209, 248, 219, 222
See application file for complete search history.

(56) References Cited

U.S. PATENT DOCUMENTS

| | | | | |
|---|---|---|---|---|
| 5,802,313 | A * | 9/1998 | Mitchell et al. | 709/238 |
| 5,848,398 | A * | 12/1998 | Martin et al. | 705/14 |
| 5,946,685 | A * | 8/1999 | Cramer et al. | 707/10 |
| 6,366,907 | B1 * | 4/2002 | Fanning et al. | 709/215 |
| 6,523,035 | B1 * | 2/2003 | Fleming et al. | 707/10 |
| 6,604,148 | B1 * | 8/2003 | Dennison | 709/245 |
| 6,678,724 | B2 * | 1/2004 | Nakajima et al. | 709/219 |
| 6,865,600 | B1 * | 3/2005 | Brydon et al. | 709/219 |
| 6,931,410 | B2 * | 8/2005 | Anderson et al. | 707/100 |
| 6,947,940 | B2 * | 9/2005 | Anderson et al. | 707/10 |
| 2002/0049760 | A1 * | 4/2002 | Scott et al. | 707/10 |
| 2002/0062375 | A1 * | 5/2002 | Teodosiu et al. | 709/226 |
| 2002/0138576 | A1 * | 9/2002 | Schleicher et al. | 709/205 |
| 2002/0143855 | A1 * | 10/2002 | Traversat et al. | 709/202 |
| 2002/0184310 | A1 * | 12/2002 | Traversat et al. | 709/204 |
| 2003/0009518 | A1 * | 1/2003 | Harrow et al. | 709/203 |
| 2003/0009586 | A1 * | 1/2003 | Harrow et al. | 709/238 |
| 2003/0009587 | A1 * | 1/2003 | Harrow et al. | 709/238 |
| 2003/0014521 | A1 * | 1/2003 | Elson et al. | 709/225 |
| 2003/0018712 | A1 * | 1/2003 | Harrow et al. | 709/203 |
| 2003/0055894 | A1 * | 3/2003 | Yeager et al. | 709/204 |
| 2003/0074403 | A1 * | 4/2003 | Harrow et al. | 709/203 |
| 2003/0097299 | A1 * | 5/2003 | O'Kane et al. | 709/200 |
| 2003/0101235 | A1 * | 5/2003 | Zhang | 709/218 |

(Continued)

FOREIGN PATENT DOCUMENTS

| | | |
|---|---|---|
| JP | 07-44447 A | 2/1995 |

(Continued)

OTHER PUBLICATIONS

P2P networking: How is the Technology Developing and Can It Survive Music Industry Attacks?, By Adam Pooler, University of Brighton, 2004.*

(Continued)

*Primary Examiner*—Larry D Donaghue
*Assistant Examiner*—Ajay Bhatia
(74) *Attorney, Agent, or Firm*—Townsend and Townsend and Crew LLP

(57) ABSTRACT

A peer-to-peer file sharing system includes software components for providing and maintaining a virtual directory in a server system component of the file sharing system. Client system components of the file sharing system cooperate with the server system to facilitate manipulations to the virtual directory.

4 Claims, 12 Drawing Sheets

Deleting Subdirectories
1002 User selects a subdirectory in browser UI.
1004 Browser sends 'request subdirectory deletion' message to server.
1006 Is empty? No / Yes
1008 The server searches directory table and retrieves directory properties of selected subdirectory.
1010 The server checks ACL of the subdirectory.
1012 Does the user have permission? Yes / No
1014 The server returns 'reject deletion' to browser.
1016 The server deletes subdirectory entry in the directory table.
1018 The server returns 'subdirectory deleted' message to the browser.
1020 The browser UI deletes display of the requested subdirectory.

U.S. PATENT DOCUMENTS

| | | | | |
|---|---|---|---|---|
| 2003/0105831 | A1 * | 6/2003 | O'Kane et al. | 709/217 |
| 2003/0158958 | A1 * | 8/2003 | Chiu | 709/231 |
| 2004/0023723 | A1 * | 2/2004 | Jandel et al. | 463/42 |
| 2004/0030731 | A1 * | 2/2004 | Iftode et al. | 707/205 |
| 2004/0148434 | A1 * | 7/2004 | Matsubara et al. | 709/246 |
| 2005/0074100 | A1 * | 4/2005 | Lederman | 379/102.01 |
| 2005/0102370 | A1 * | 5/2005 | Lin et al. | 709/217 |
| 2005/0259579 | A1 * | 11/2005 | Fanning | 370/282 |
| 2006/0248337 | A1 * | 11/2006 | Koodli | 713/171 |

FOREIGN PATENT DOCUMENTS

JP 07-262072 A 10/1995

OTHER PUBLICATIONS

A DRM system suitable for P2P content delivery and the study on it implemenation.*

Definition of "server", Computer Desktop Encyclopedia copyright © 1981-2005 by The Computer Language Company Inc.*

CITI Technical Report 93-3, Disconnected Operation for AFS, L.B. Huston, lhuston@citi.umich.edu, P. Honeyman, honey@citi.umich.edu, Jun. 18, 1993.*

Product Description of Kontiki, Inc., Kontiki Technology: The Mojo, 2000-2001.

Product Description of XDegrees, Inc., Introducing XDegrees Technology, 2001.

Product Description of NextPage, Inc., NXT™ 3 Content. Connected, 2001.

The Emergence of Distributed Content Management and Peer-to-Peer Content Networks, Gartner Group, Inc., Jan. 2001.

Yamazaki "P2P network System," Journal of the Japanese Society for Artificial Intelligence vol. 16, No. 6, pp. 834-840 (Nov. 1, 2001).

Japan Patent Office (JPO) office action for JPO patent application 2003-077201 (Dec. 9, 2008).

* cited by examiner

METHOD AND APPARATUS FOR PEER-TO-PEER FILE SHARING

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to file sharing systems and in particular to a peer-to-peer file sharing method and system.

In a conventional peer-to-peer (P2P) file sharing network, files are registered with their properties; e.g., file name, file type, file size, etc. Searching through the files involves identifying keywords that are relevant to the subject matter of interest and performing searches of the file properties using the keywords.

In a P2P file sharing system, a user installs client software (browser) on her local computer system; e.g., a personal computer. In use, the user specifies files to be registered on a management server using the browser. The browser reads the file properties of the specified files and registers the file properties to the management server. The browser also sends file location information (e.g., IP address of the local computer, the directory in which the file is located, etc.) to the server.

After file properties are registered with the management server, a user can send a request (by using the browser) to the management server to search the file properties using keywords provided by the user. The management server sends lists of file properties that match the keyword as search results. The user selects from the list those files it wants to download. The browser then sends a request for file location information to the management server, and the management server returns file location information to the user. The browser uses the file location information to connect to the computer system(s) that contain the files, and downloads the files directly from those computer systems.

The advantage of P2P file sharing is that the physical files are distributed across the users' local computer systems. Consequently, the storage load on the management server is greatly reduced as compared to a server/client system. Also, the files can be downloaded directory from one user computer to another (hence the term "peer-to-peer"), so the computation load and network bandwidth can be load balanced among the multiple user computer systems. For these reasons, P2P file sharing approach provides a more scalable file storage method as compared to the server/client approach.

Some P2P file sharing solutions provide a directory menu in which a user can browse and select files. This directory is created and managed at the management server by a system manager (e.g., a service provider). This directory cannot be easily modified by the user because the creation and deletion of directories and the registration and deletion of files must be performed by the system manager. As the number of files and directories increase, the burden on the system manger becomes overwhelming.

It can be appreciated then that there is a need for an improved P2P file sharing method.

SUMMARY OF THE INVENTION

A peer-to-peer file sharing method and system comprise a server system and a plurality of client systems. A virtual directory is maintained in the server system to facilitate file management by users in the client systems. Various manipulations to the directory can be made by the users to facilitate the cataloging of files in the system, while at the same time providing the benefits of a peer-to-peer file sharing system.

DESCRIPTION OF THE SPECIFIC EMBODIMENTS

Figure 1:
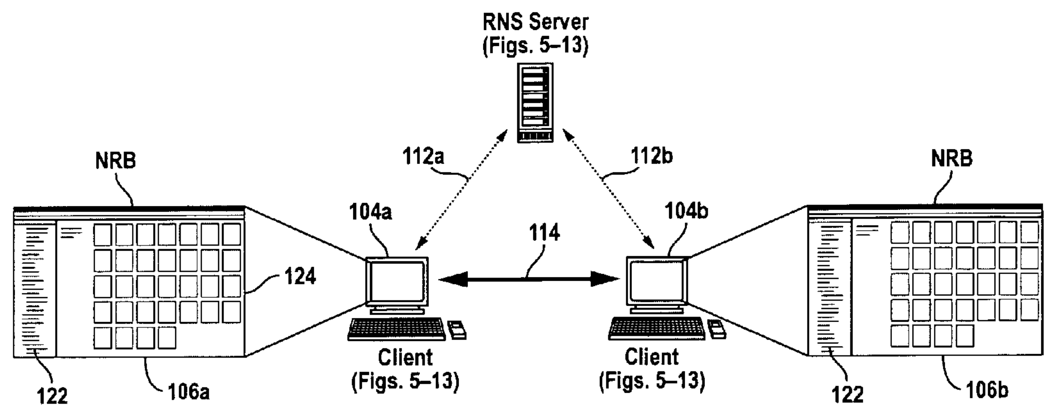
FIG. 1 is a high level system block diagram of an example of a peer-to-peer file sharing system in accordance with the present invention.

FIG. 1 is an example of a peer-to-peer file sharing system 100 according to an embodiment of the invention. A resource naming service (RNS) server 102 stores and manages a directory of "file links." The directory may have 'links' that connect to another directory. The structure of the directory (i.e., how the directories are interconnected) can be a hierarchical tree structure, or it can be a mesh structure, or some other convenient structure. Under each directory, there can be a plurality of file links. A file link is a reference to a physical file. As will be explained below, the physical files typically are distributed throughout the system. The RNS server also stores and manages file properties associated with each physical file. The RNS server can be any suitable computing platform, ranging from simple PC's (personal computers) to workstations to multiprocessor systems to distributed computing systems. Typical hardware in a server include a processing component, a memory component and a data storage component. Computer program code can be stored in both the data storage component and in the memory component, being swapped between the two components during the normal operation of the server system.

Server software provides the functionality highlighted in the flowcharts shown in FIGS. 5-13. It can be appreciated that any suitable programming language and methodology can be used to provide the services in accordance with the present invention.

Figure 1A:
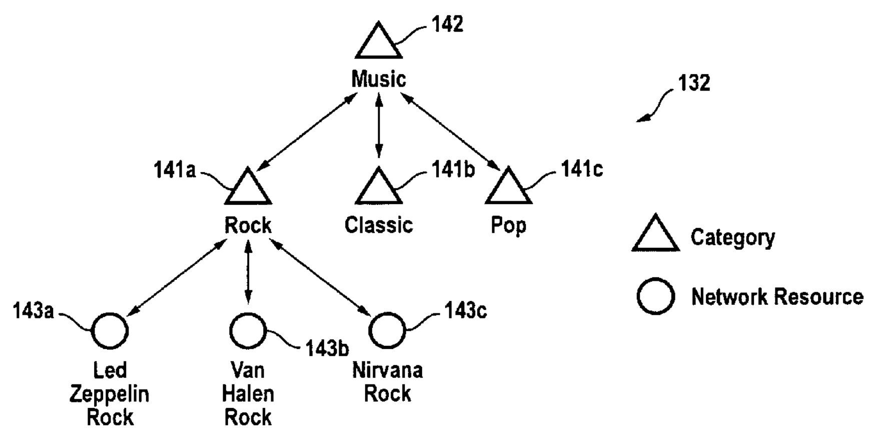
FIG. 1A shows a hierarchically structure directory structure, illustrating a typical directory structure arrangement.

FIG. 1A illustrates an example of a hierarchical directory structure that can be maintained by the RNS server 102. The particular implementation shown for directory 132 is a conventional tree structure. There is a root directory (node) 142. The root directory can contain subdirectories or actual file links. In the example shown in the figure, the root directory has three subdirectories 141*a*-141*c*. The subdirectory 141*a* comprises file links 143*a*-143*c*.

FIG. 1A shows a specific example of a directory organized into categories for music. Thus, each node (directory) represents a music category. The root node is the category MUSIC. Subcategories might included types of music, such as ROCK, CLASSICAL, and POP. Under the category of ROCK, there might be further categories and/or file links. The file links are identifiers of the physical file. In general, a file link is an identifier to any object that can be accessed via the network, including in addition to physical files, a PC, a printer, a network node, a service, users, user groups, and so on (also referred to as network resources). In the example of a directory organized for music shown in FIG. 1A, the file links are identifiers of files such as audio files of the actual music, or text files containing the lyrics, video files, and so on.

Returning to FIG. 1, a plurality of client systems 104*a*, 104*b* are coupled to the RNS server 102 via communication link, 112*a*, 112*b* respectively. Client systems typically comprise PCs and workstations and the like. It is noted that a client system generally can be provided by any appropriate computing architecture. As will be explained below, each client system is provided with software (hereinafter network resource browser, NRB software, NRB client, NRB browser) suitable for interacting with the RNS server in accordance with the invention. The client systems are also in communication with each other via communication link 114. Generally, the communication links 112*a*, 112*b* and 114 can be based on any of known communication technologies.

The functionality of the NRB software is highlighted in the flowcharts of FIGS. 5-13. The software can be based on any of a number of programming languages and methodologies. The NRB software functions in two modes of operation: a browsing mode and an editing mode.

Briefly, in the browsing mode, a user can browse through the directory in the same manner as browsing through an HTTP (hypertext transport protocol) or FTP (file transfer protocol) based WEB server. The browser can display the directory and its subdirectories of file links. Examples of a browser display are shown in the screenshots 106*a*, 106*b*. The examples show a conventional directory structure arranged in a linear format in a Microsoft® Explorer window 122. When a user clicks on a directory, the browser will jump to the directory. The browser will show in a window 124 the directories that are connected to the current directory and also the file links that are in that directory. The Microsoft Explorer window is shown merely for illustrative purposes. It can be appreciated that the term "browser" need not be limited to specific popularly recognized browsers such as the Netscape Navigator browser and so on. Rather, "browser" is intended to refer generically to any interface (textual, graphical, virtual, etc.) which can provide functionality for navigating a directory.

In the editing mode, a user can edit subdirectories and file links that are maintained and stored by the server. The user interface can be fashioned according to known window-based interfaces, such as the Apple Macintosh interface, or Microsoft's Explorer interface. The directory structure is shown in the screenshot 106*a*, for example, lists the subdirectories and file links in the window 124 that are under the selected directory shown in window 122. Using techniques such as "drag-and-drop" or copy-and-paste, directories and file links can be added, copied, moved about, and deleted by the user.

Figure 2:
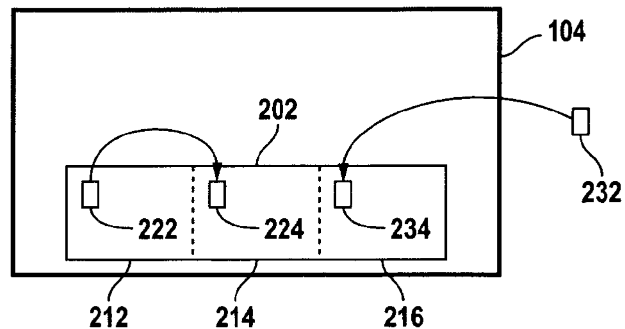
FIG. 2 diagrammatically illustrates a data storage component of a client system in accordance with an embodiment of the present invention.

FIG. 2 illustrates an implementation aspect of an embodiment of a client system 104 in accordance with the present invention. The client system includes, among other components, a data storage component, 202. The data storage component comprises a client portion 212 for storing files created locally by a user or users at the client system. The storage component includes a distribution file archive 214 for storing "distribution files." The storage component further includes a cache file archive 216 for storing "cache files."

The data storage component 202 shown in the figure is an abstract representation of the data storage facility provided at the client system. The data storage component can be a single data storage unit, or a plurality of data storage units, or some other appropriate configuration of data storage capability.

Distribution files are local files 222 that a user "registers" on the RNS server 102 (discussed below). These files are local to the client system 104; i.e., they are not normally accessible by other client systems. When the user registers a local file 222 in one of the directories (e.g., FIG. 1A) in the RNS server, a copy of the local file, originally stored in the client portion 212 of the data storage component 202 is stored as a distribution file 224 in the distribution file archive 214. This distribution file can be encrypted to provide security.

Cache files 234 are files that are cached in the cache file archive 216 of the data storage component 202. When a user downloads a remote file 232 from another client system, the browser running on the user's client system 104 stores a copy of the downloaded file as a cache file 234 in its cache file archive. Cache files can be encrypted. By encrypting the cache files 234, it is not possible for the user to modify the stored cache file. This restriction prevents the stored cache file from being modified, thus ensuring consistency between the distribution file and the cache files and otherwise ensuring against tampering of the file contents.

Figure 3:
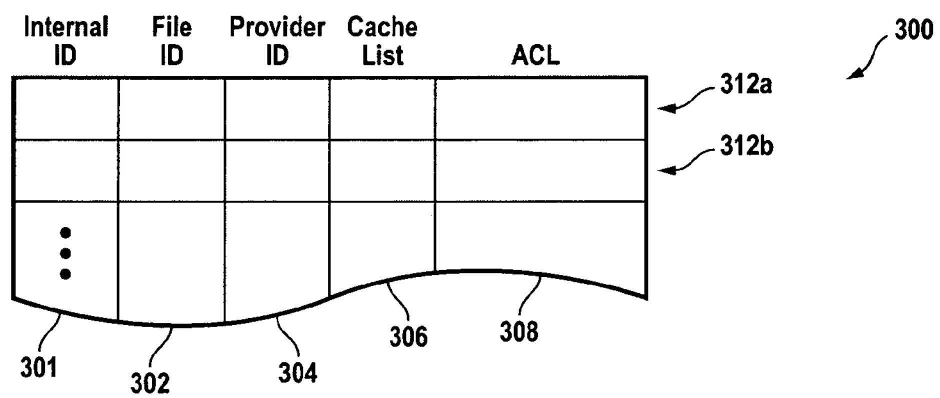
FIG. 3 is an abstract representation of a file table according to an embodiment of the present invention.

FIG. 3 is an abstract representation of a file table 300 illustrating the information used by the RNS server 102 to provide the various functionalities in accordance with the present invention. The file table contains certain information for each file (called file properties) that is "registered" with the RNS server. When a file is registered, a "file link" representative of the file is created and stored in the file table. There is an entry (e.g., 312*a*, 312*b*) for each file link that is stored in the RNS server. A unique file ID 302 provided by the user is assigned to each file. The RNS server can ensure the uniqueness of the file ID within the subdirectory when a user attempts to register a file.

Typically, the file ID will be some character string provided by the user that is meaningful to the user. While the file ID can be used for internal processing by the server software it may be more efficient to use an internally generated file ID 301 instead. Such internal IDs are typically a simple number (e.g., an index in an array, an address of a memory location, etc.), which is more efficiently processed by software.

A provider ID 304 identifies the originating user who registered the file with the RNS server. The RNS server maintains a user table (not shown) which contains information about each user, including among other information, a "user ID." The provider ID field in the file table 300 is filled with the user ID obtained from the user table.

A cached user list 306 is a list of those users who are "on-line" and who are able to provide access to the file. This list includes the originating user of the distribution file (224, FIG. 2) if she is on-line, and those on-line users whose client systems have the file cached in their cache file archives (216, FIG. 2). In one particular implementation, the user table (not shown) might include for each user a "logged in" field, which indicates whether the user is on-line or not. The cache user list might simply be a list of all users, on-line or not, who have a copy of the file on their corresponding client systems. By referring to the "logged in" field in the user table, the RNS server can determine which client systems are available for providing access to the file.

An access control list field 308 can be provided to limit access to a file. Access control (e.g., read, write, modify, delete, etc.) can be based on individuals, where each individual is given specific access capability. Access control can be based on groups of individuals. Or, a single access capability can be applicable to all who can access the file.

A user is considered "on-line" when the client system 104*a* (FIG. 1) is running the NRB software. The user table (not shown) might include a "user access information" field which allows the users to communicate among themselves. A notable example of user access information, of course, is the IP (internet protocol) address of a user, which is suitable for communication over the internet. Proprietary addressing schemes may be used where the invention is provided in a private network. More generally, the user access information for a given user can be any suitable information that can be communicated to other users which allow such other users to communicate with the given user.

In accordance with an implementation of an embodiment of the invention, the NRB software can initiate a log in procedure to announce the availability of the client system to the RNS server 102 for the purpose of peer-to-peer file sharing. When a user is "announced" to the RNS server, the server will update the cached user list 306 of each file in the file table that is stored in that user's system, including distribution files and cached files. The user thus becomes another access point for the files which are contained in the distribution file archive (214, FIG. 2) and cached file archive 216 of her client system.

When the NRB software is terminated, a logout procedure can be initiated to inform the RNS server that the logged out client system is no longer available for peer-to-peer file sharing. In another implementation, the NRB software and the RNS server can use a "heartbeat" technique to determine when the NRB software is no longer running. This might be appropriate in less stable operating systems, where the operating system is prone to occasional crashes or lock-ups, or some other catastrophic occurrence where communication between the server and client ceases. In such case, a proper logout procedure is not possible and the RNS server would not detect the unavailability of the client system. When a user is no longer "logged" into the RNS server, the cached user list 306 of each file in the file table that is contained in the user's distribution file archive 214 or in the cached file archive 216 is updated to reflect that those particular files are no longer available from that user.

Figure 4:
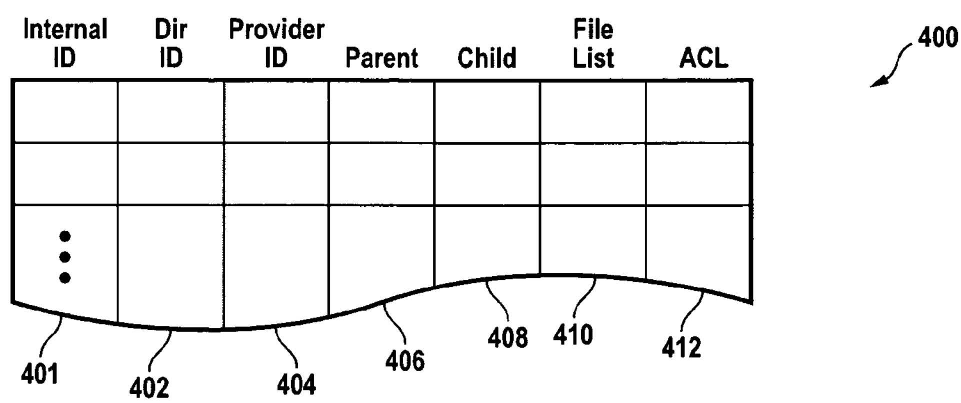
FIG. 4 is an abstract representation of a directory table according to an embodiment of the present invention.

FIG. 4 is an abstract representation of a directory table 400 of file links, illustrating the information (collectively referred to as the "directory properties") used by the RNS server 102. A directory ID 402 represents the name of the directory node; for example, in FIG. 1A the directory ID for node 142 would be "MUSIC". While the directory ID can be used internally by the server software, it may be more efficient to use an internally generated directory ID 401 instead. Such internal IDs are typically a simple number (e.g., an index in an array, an address of a memory location, etc.), which is more efficiently processed by software.

A provider ID 404 represents the user who created the directory node. A parent directory field 406 provides a reverse link to the parent node. A child directory field 408 points to the subdirectories contained in this directory. The parent and children directory fields can comprise a list of the internally generated directory IDs 401. A file list field 410 specifies the files contained in this directory. The file list field can comprise a list of the internally generated file IDs 301 from the file table 300, thus creating a link from the physical files to a subdirectory in the directory table (hence "file link"). Since the files physically reside on the various client systems, the directory contained in the server system can be considered to be a virtual directory.

A directory access control list 412 can be provided to limit access to the directories in the same manner as discussed above for file links.

It can be appreciated that many conventional implementations of the file table and directory table are possible. For example, a database system can be designed to provide the file and directory table functionality. If customized software is written, the file table and directory table might be implemented using various interrelated data structures, and so on.

In a particular implementation of an embodiment of the invention, a VRL (virtual resource locator) serves to identify the location of a file link in the RNS directory. The VRL uses a UNIX-like naming convention, starting with the name of the root node and ending with the name of a directory or a file link, including the sequence of the intermediate directories; e.g., the VRL '/root/directoryA/directoryB/fileA.' would identify the file link "fileA" in a directory having a root node named "root" with intermediate subdirectories "directoryA" and "directoryB" respectively.

Figure 5:
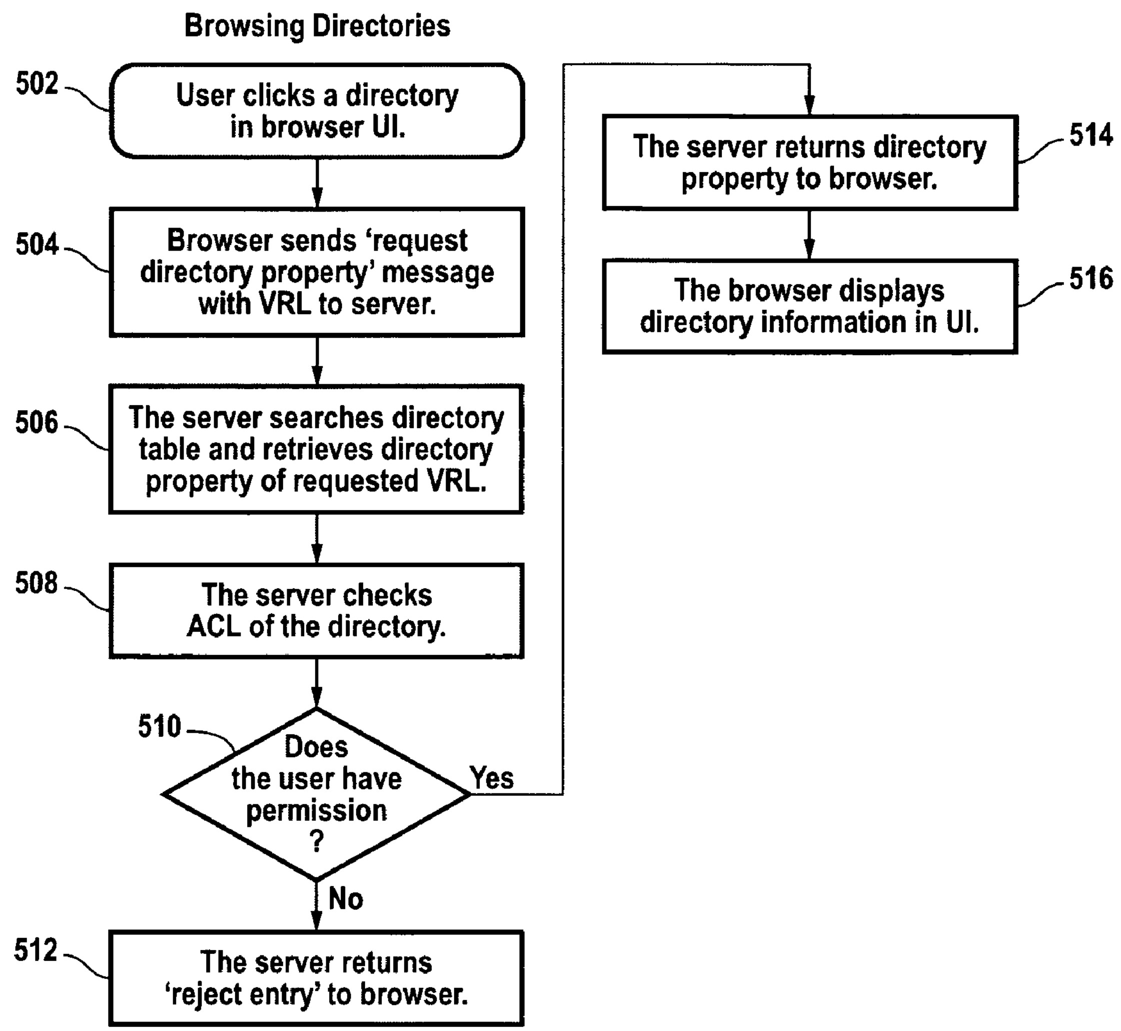
FIG. 5 is a high level flow chart showing the basic steps for browsing directories of file links according to the present invention.

Following are high level descriptions of the functionality collectively provided by the client and server software in accordance with the present invention. The following system procedures are provided:

browsing directories,
downloading files
creating directories
registering files
creating file links
deleting directories
de-registering files
deleting file links
deleting distribution files FIG. 5 represents a high level flow diagram of the processing for browsing directories in accordance with a particular implementation of an embodiment of the present invention. In a step 502, the NRB software of a requesting NRB client system detects a user selection of an RNS server directory displayed in the browser UI (e.g., window 122 in FIG. 1). In response to detecting the user's selection, a request for the directory properties is communicated along with the VRL of the selected directory, in a step 504, to the RNS server. Next, in a step 506, the RNS server searches the directory structure (s) based on the VRL to retrieve the directory properties. The access control list 408 of the selected directory is examined to determine if the user is permitted access to the selected directory, in steps 508 and 510. If the user does not have access rights, then the server simply returns a reject response to the NRB software, in a step 512. The NRB software can then indicate the rejection to the user in any of a number of ways. On the other hand, if the user has access to the selected directory, then the server communicates some or all of the directory properties of the selected directory, in a step 514. The browser, in a step 516, can then display the directory properties such as the children directories and the file links, in an appropriate format.

Figure 6:
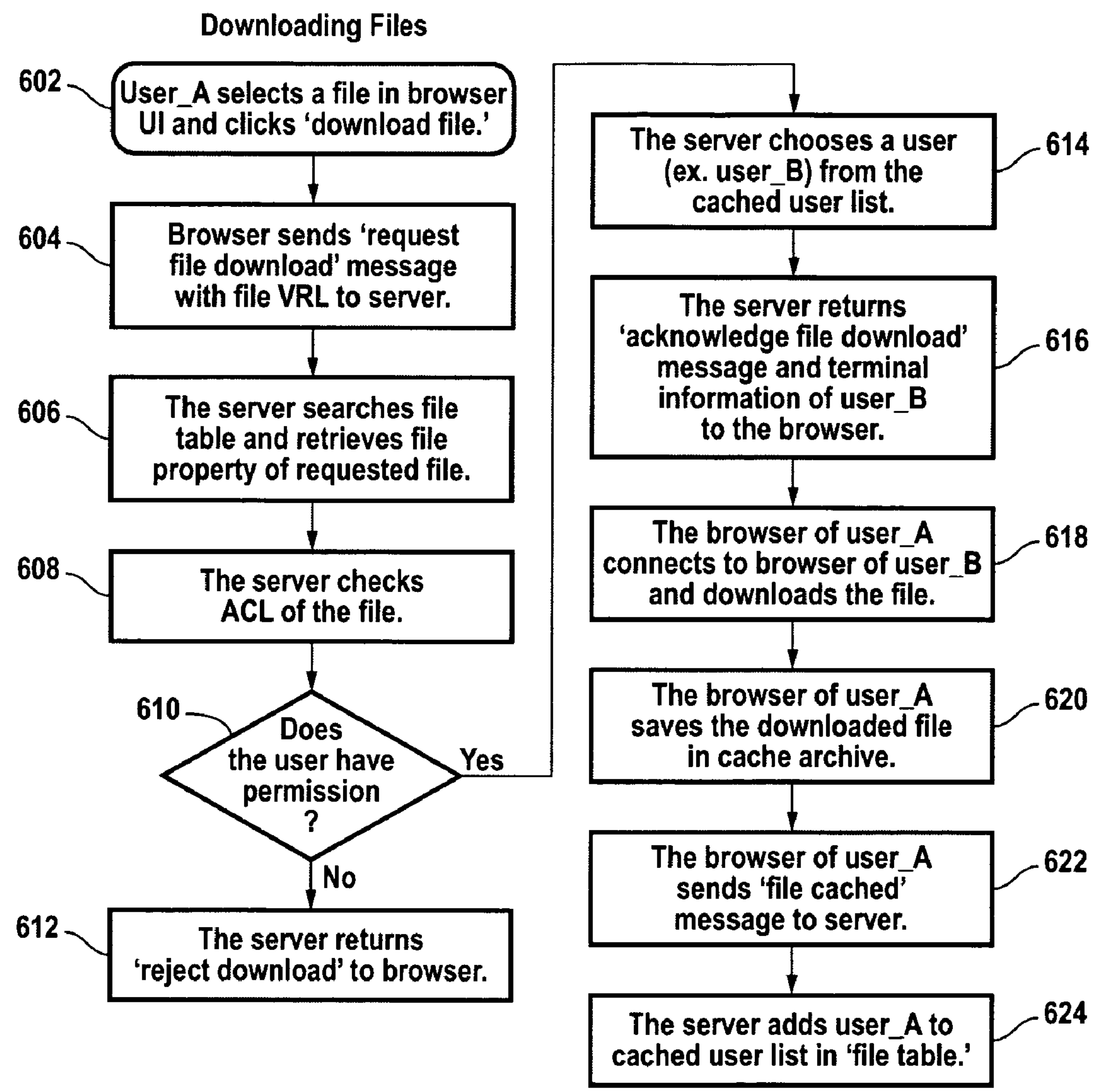
FIG. 6 is a high level flow chart showing the basic steps for downloading files from the peer-to-peer file sharing system according to the present invention.

FIG. 6 represents a high level flow diagram of the processing for downloading files from the file sharing system in accordance with a particular implementation of an embodiment of the present invention. In a step 602, a user (user_A) at a requesting client system selects a file link in the RNS server. This is detected by the NRB software, thus initiating a request to download the selected file to user_A's system. In a step 604, the NRB software communicates a request for file download, including the VRL of the file link. In steps 606 and 608, the server software accesses the file properties of the selected file vis-á-vis the VRL and examines the access control list 308 of the selected file. In steps 610 and 612, if the access control list of the selected file indicates that user_A does not have permission for the requested download operation, the server will communicate a reject indication to the NRB software.

If the access control list 308 of the selected file indicates that the download operation is permitted, then in a step 614 the server software will select a user (say, user_B) from the cached user list 306. Recall, the cached user list is a list of those users who have a copy of the requested file. The "logged in" field of the user table (not shown) indicates those users who are logged in. The "user access information" from the user table provides access to the NRB browsers which are "logged in" with the RNS server and which have the requested file in their cache file archives 216.

The selection of a user from the cached user list can be made based on any suitable criteria. For example, the selector can be made based on geographical locations of the requesting client system and the client system which is to supply the requested file. The selection can be made based on metrics that can be tracked for each client system; such as system throughput, system availability, number of accesses made to the client system, connection quality, etc. The selection can be a random selection, and so on.

In a step 616, the server communicates an acknowledge response to user_A's NRB client. In addition, the user access information for user_B's NRB client is communicated to user_A's NRB client. A communication channel/session is established between user_A and user_B, in a step 618. The respective NRB browsers communicate to effect a download of the requested file (e.g., 232, FIG. 2) from user_B to user_A. In a step 620, user_A stores the downloaded file (e.g., 234, FIG. 2) into its cached file archive (216, FIG. 2). The NRB software of user_A then communicates to the RNS server a file cached message, in a step 622. In response, the server adds user_A to the cached user list 306 of the selected file, in a step 624.

Figure 7:
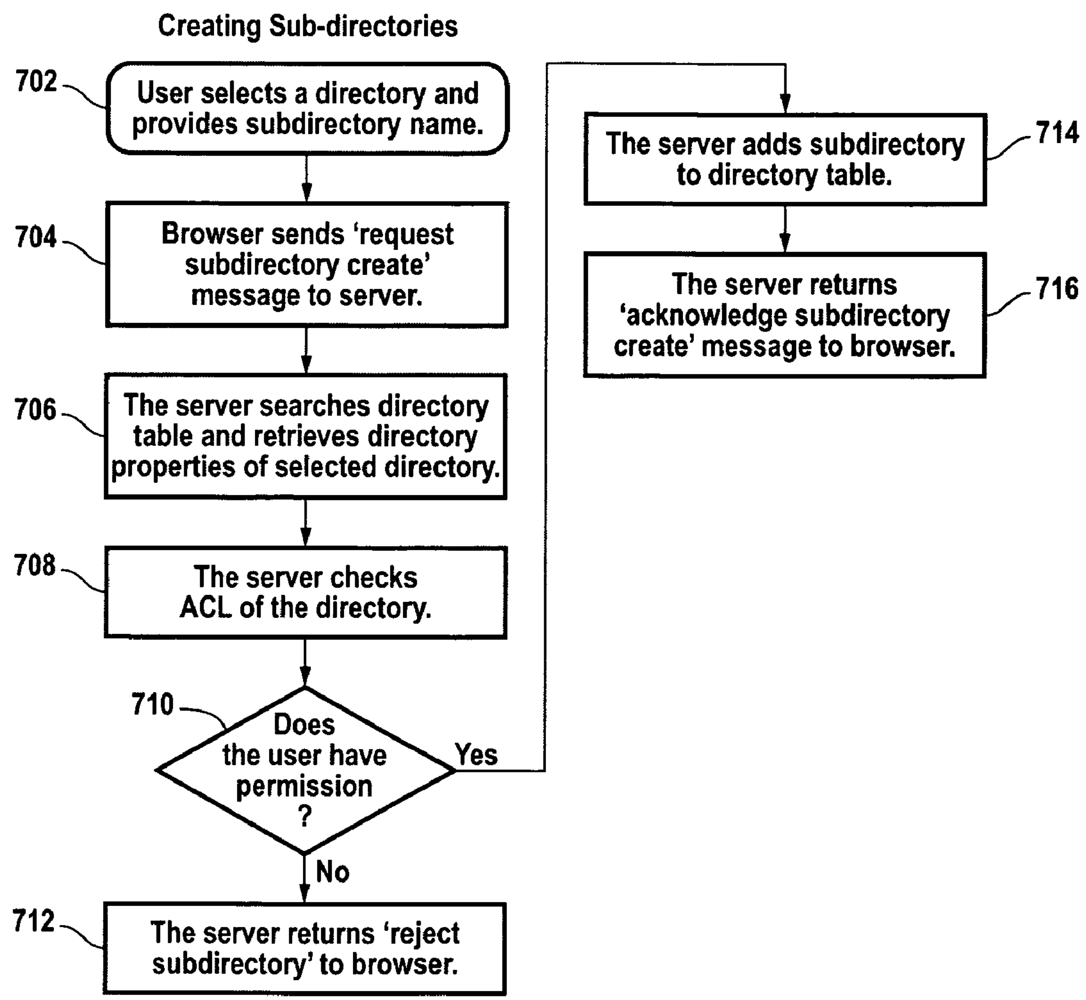
FIG. 7 is a high level flow chart showing the basic steps for creating subdirectories according to the present invention.

FIG. 7 represents a high level flow diagram of the processing for creating subdirectories in accordance with a particular implementation of an embodiment of the present invention. In a step 702, the NRB browser at the requesting NRB client detects the selection of a directory by a user. The user provides the name of a new subdirectory to be added to the selected directory. The NRB software communicates to the RNS server a request for directory creation in the selected directory, in a step 704, including a VRL representing the new subdirectory. The RNS server searches the directory structure (s) to retrieve the directory properties of the selected directory, in a step 706. The server then examines the access control list of the selected directory in a step 708 to determine if the user has permission to create the subdirectory. If it is determined that the user does not have permission (step 710), then in a step 712 the RNS server will communicate a reject response to the client. If the user can create the subdirectory, then the server will create the subdirectory (step 714) and communicate a positive acknowledgement (step 716) to the NRB browser indicating a successful subdirectory creation.

Figure 8:
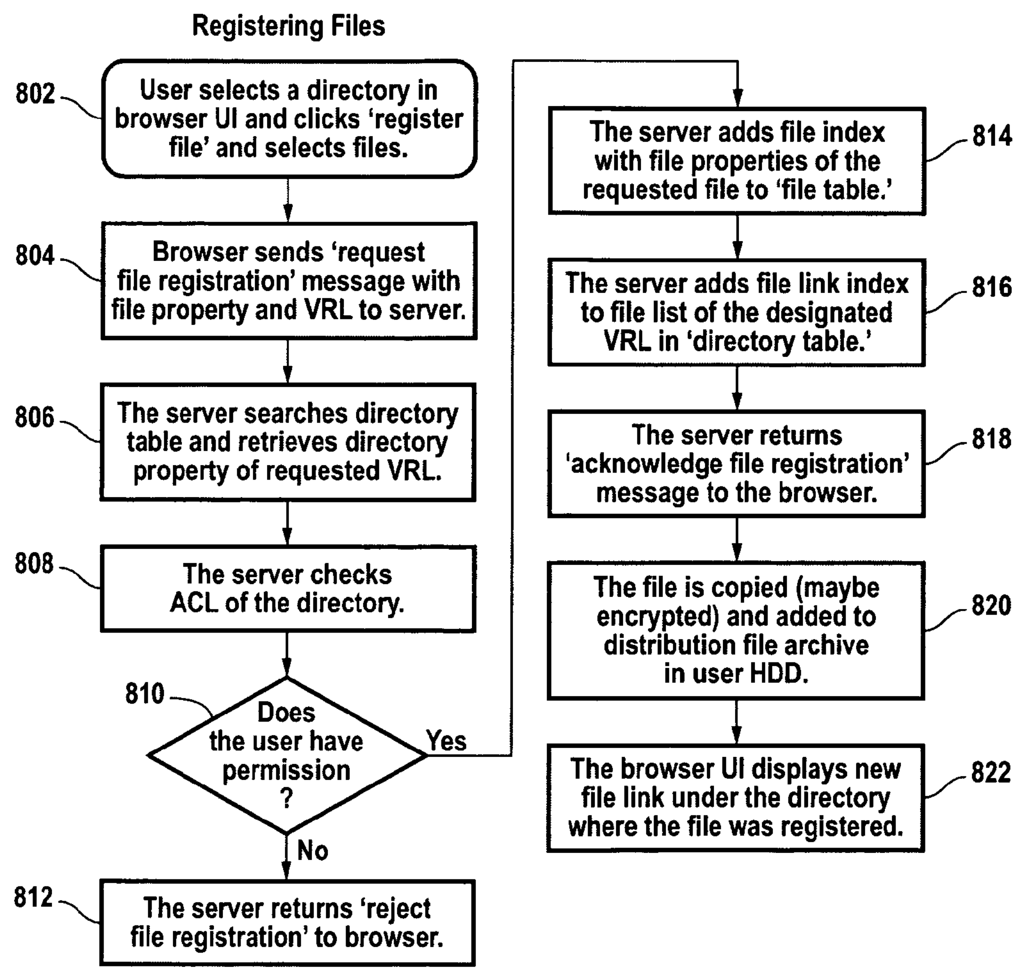
FIG. 8 is a high level flow chart showing the basic steps for registering files according to the present invention.

FIG. 8 represents a high level flow diagram of the processing for registering files in accordance with a particular implementation of an embodiment of the present invention. In a step 802, a user at a requesting client system selects a directory in the RNS server where the file(s) local to the user's client system are to be registered. Next, in a step 804, the browser software communicates a file registration request to the RNS server, including a VRL of the destination directory. This communication can include file property information for each local file to be registered. In a step 806, the server retrieves the directory properties of the directory specified by the VRL, and in a step 808 examines the access control list to determine if the user can register files in the selected directory. If it is determined in a step 810 that the user does not have file registration access, then the server will communicate a reject response in a step 812.

Otherwise, in a step 814, the server will create an entry for each local file specified by the user, and fill the entry with the user-provided file properties. Then, in a step 816, the server will add the file entries to the directory entry in the directory table of the selected directory, thus creating a file link to the user's selected local files. An acknowledge response is communicated to the browser client in a step 818. In response, the browser client in a step 820 will create a copy of each of the selected local files in the user's distribution file archive (214, FIG. 2). The copy operation may include an encryption step. Then in a step 822, the browser software updates its display to indicate the addition of the file links.

Figure 9:
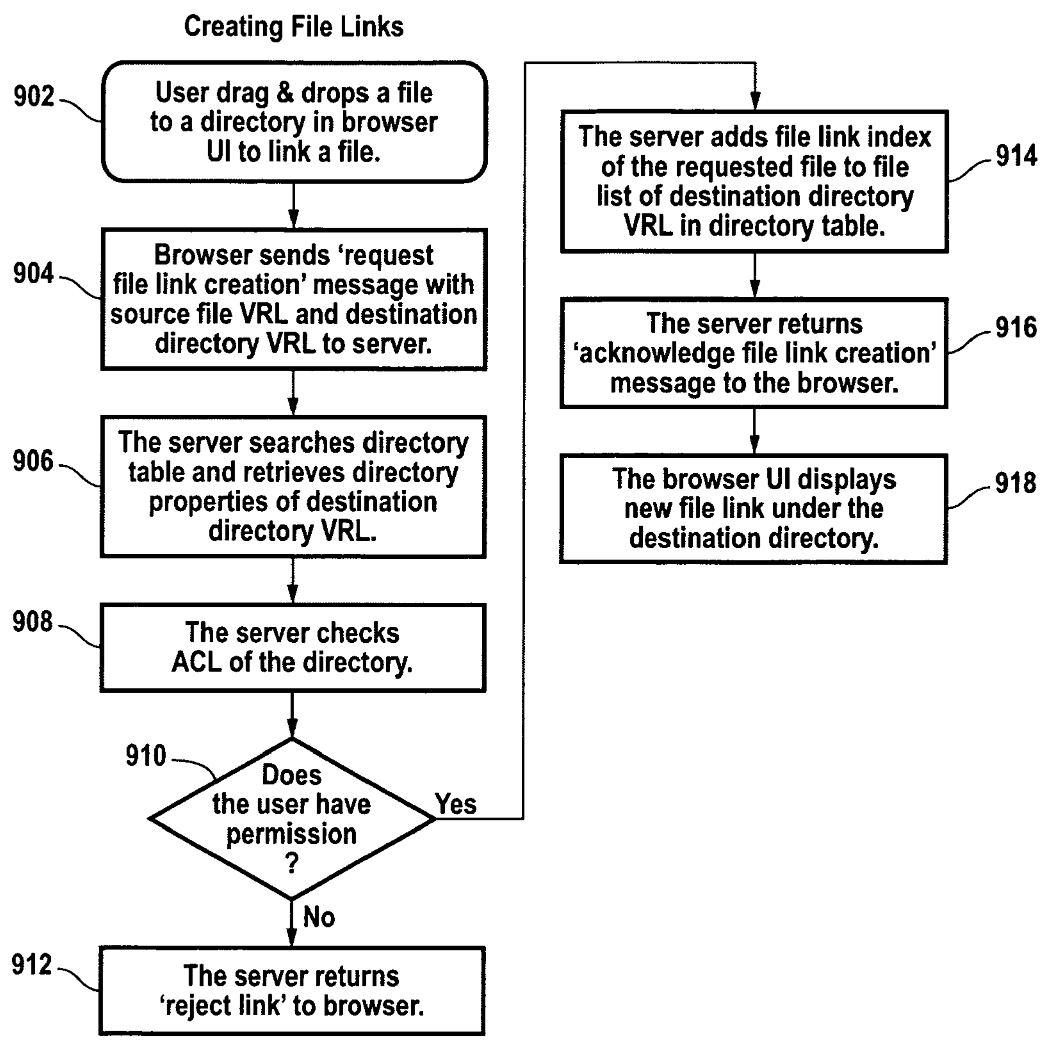
FIG. 9 is a high level flow chart showing the basic steps for creating file links according to the present invention.

FIG. 9 represents a high level flow diagram of the processing for creating file links in accordance with a particular implementation of an embodiment of the present invention. This procedure allows a user to create additional file links to a previously registered file. In a step 902, the user selects via the NRB browser a file link of a registered file, and selects a directory in which the new file link is to be placed. In a step 904, the NRB browser communicates a request to create a file link to the RNS server, including a source VRL representing a file link of the registered file and a destination VRL of the directory in which the new file link is to be created. The server retrieves the directory properties of the destination directory based on the destination VRL in a step 906 and examines its access control list in a step 908. If it is determined in a step 910 that the user does not have file link create permission, then in a step 912, the server communicates a rejection response. Otherwise, in a step 914 the server adds the new file link to the file list field 410 of the destination directory. Then in a step 916 the server communicates to the NRB browser an acknowledge response indicating the addition of the new file link. The NRB browser then updates the display in a step 918 to indicate the added file link. It is worth noting that in step 902, the user can select any file link that is associated with a registered file, since they all refer to the same physical file.

Figure 10:
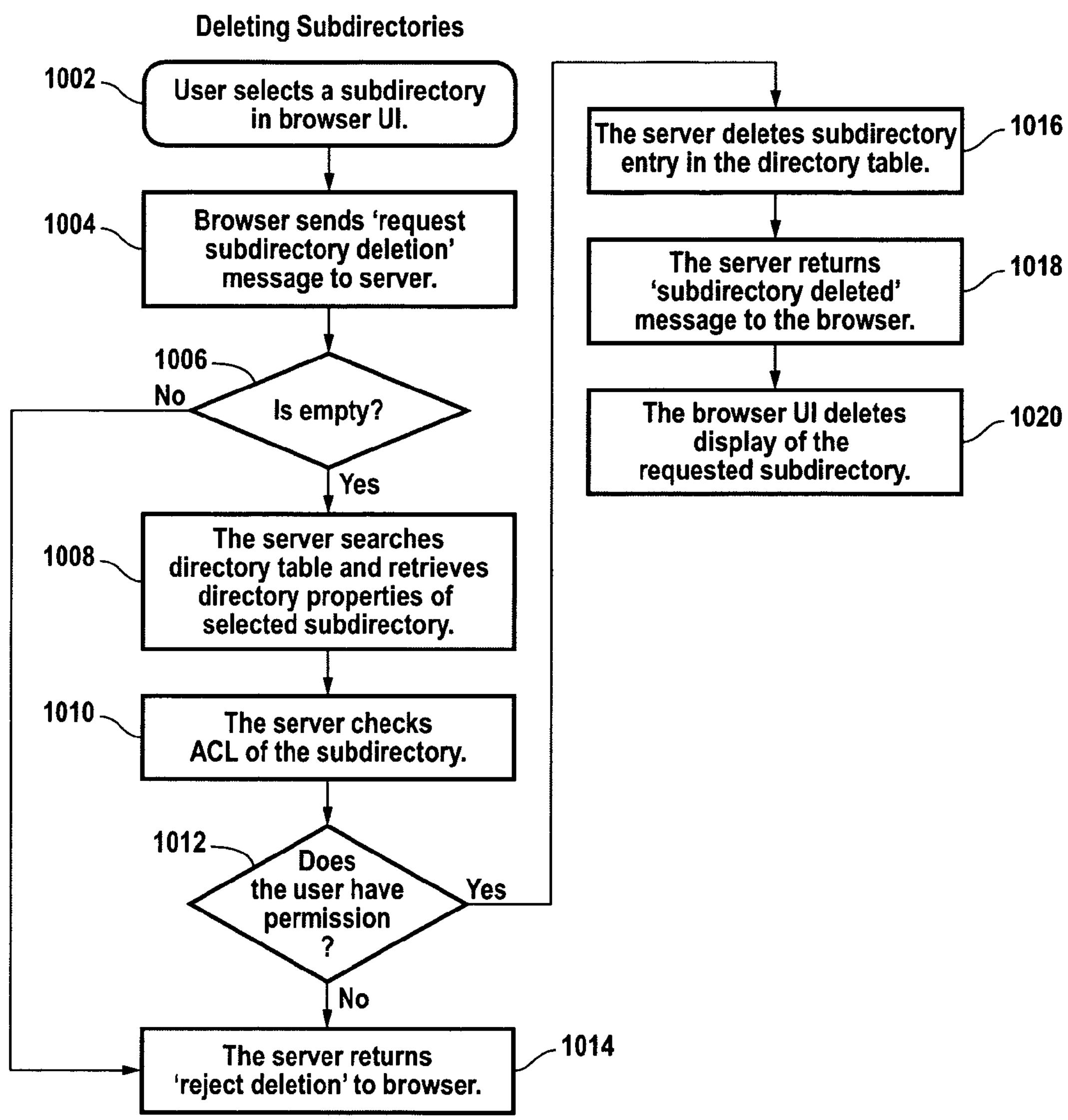
FIG. 10 is a high level flow chart showing the basic steps for deleting subdirectories according to the present invention.

FIG. 10 represents a high level flow diagram of the processing for deleting subdirectories in accordance with a particular implementation of an embodiment of the present invention. In a step 1002, the user selects the subdirectory to be deleted. The browser communicates a request to delete a subdirectory to the RNS server, in a step 1004. If it is determined in a step 1006 that the subdirectory is not empty, then in a step 1014 a reject response is communicated back to the browser. The reject response can indicate that the directory is not empty.

Otherwise, the server retrieves the directory properties of the selected subdirectory in a step 1008 and examines the access control list to determine if the user is permitted to delete the subdirectory (step 1010). If it is determined that the user does not have delete permission (step 1012), then a reject response is communicated to the browser in step 1014. Otherwise, the server effects a deletion of the specified subdirectory (step 1016) and communicates in a step 1018 an acknowledgement response. The browser in a step 1020 can update its display to reflect the deleted subdirectory.

Figure 11:
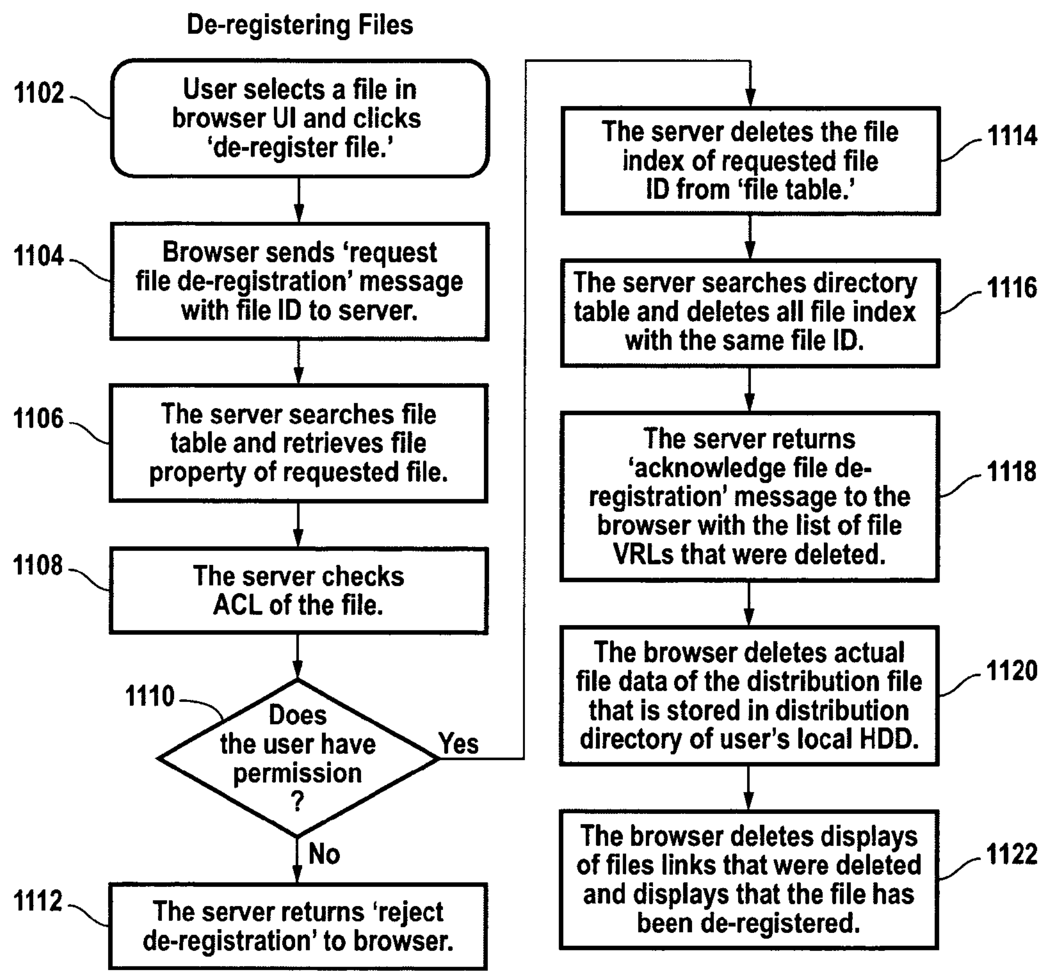
FIG. 11 is a high level flow chart showing the basic steps for de-registering files according to the present invention.

FIG. 11 represents a high level flow diagram of the processing for de-registering files in accordance with a particular implementation of an embodiment of the present invention. The NRB software detects a user-selected file to be de-registered in a step 1102. In response, the browser communicates to the RNS server a request to de-register the file, including the VRL of the file link associated with the file to be de-registered (step 1104). The server accesses the file properties of the file link corresponding to the selected file (step 1106) and examines its access control list for adequate permission (step 1108). If it is determined in a step 1110 that the user does not have permission for the operation, a rejection response is communicated to the NRB browser in a step 1112.

If the operation is permitted, then the server deletes the appropriate file table entry(ies) relating to the file link in a step 1114. The server also updates the appropriate directory table entry(ies) to indicate that the file is no longer registered (step 1116). This includes removing all the file link entries that reference the de-registered file. The effect is that the file is no longer accessible from the RNS server. In addition, the server can communicate to each client that contains a copy of the file in its cached file archive 216 an instruction to remove a copy of the file from its archive.

In a step 1118, the RNS server communicates an acknowledge response to the NRB browser. In response, the NRB browser will delete the physical file stored in its distribution file archive 214 (step 1120). The display is also update accordingly to reflect the deletion, in a step 1122. This scenario assumes that the NRB browser is the client system containing the original physical file. If another user is to be given the ability to de-register a file, the RNS server must determine which client system had the distribution file.

In another embodiment, the system can allow any user to de-register a file. In a particular implementation of such an embodiment, the cached user list 306 of the file table 300 might be configured with the convention that the originating user ID occupies the beginning of the list. The NRB browser of the originating user can then be readily located by cross-referencing the originating user ID, taken from the cached user list of the file to be de-registered, with the user table (not shown) to obtain the "user access information". Thus, any user can make a de-registration request.

Figure 12:
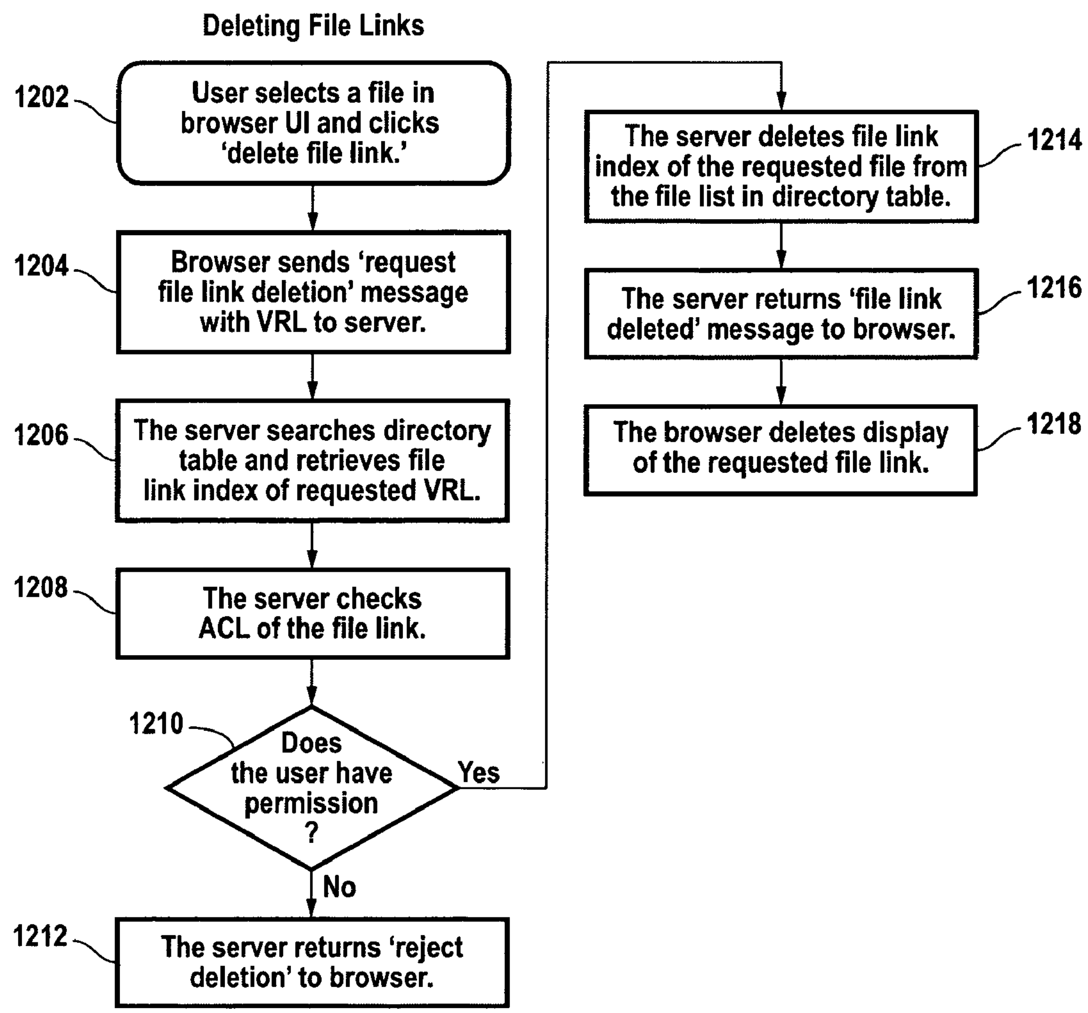
FIG. 12 is a high level flow chart showing the basic steps for deleting file links according to the present invention.

FIG. 12 represents a high level flow diagram of the processing for deleting file links in accordance with a particular implementation of an embodiment of the present invention. In a step 1202, the NRB browser detects a user's selection of a file link to be deleted. The browser communicates a request to the RNS server to delete the selected file link in a step 1204. The server retrieves the file properties of the selected file link in a step 1206, and examines the access control list of the file link in a step 1208 to determine if the delete operation can be fulfilled. If a determination is made in a step 1210 that the operation cannot proceed, then in a step 1212 a reject response is communicated to the browser. Otherwise, in a step 1214, the server deletes the specified file link including making the appropriate updates to the file table and the directory table. An acknowledgment is communicated to the browser in a step 1216, and in response the browser in a step 1218 updates the UI display to reflect the deletion of the file link.

It is noted that only the selected file link is deleted. Any additional file links to the file remain untouched. However, if the file link is the last reference to the file, the server can communicate a request to delete the distribution file from the distribution file archive of the originating user's client system. Furthermore, the server can also communicate a request to those clients where the file is stored in the cached file archives to delete the cached files.

Figure 13:
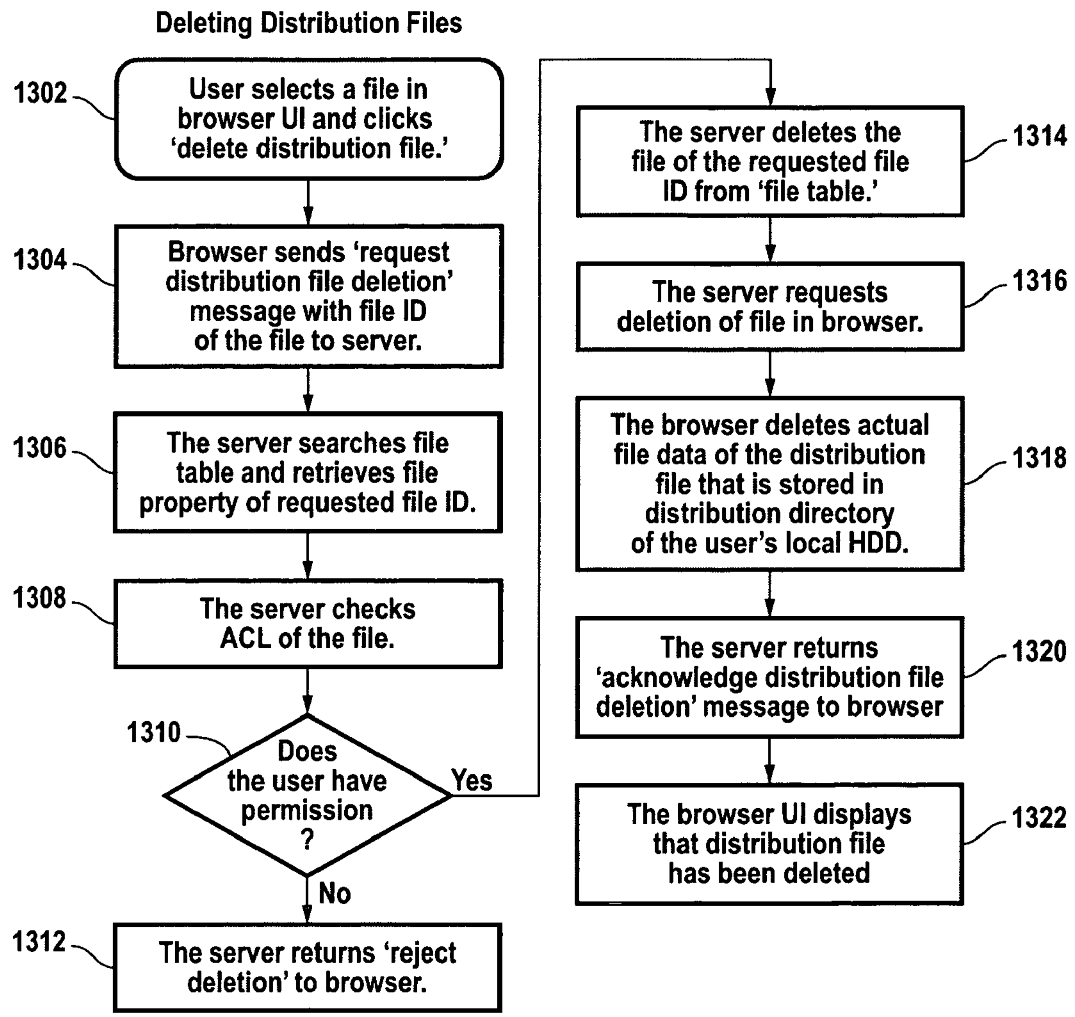
FIG. 13 is a high level flow chart showing the basic steps for deleting distribution files according to the present invention.

FIG. 13 represents a high level flow diagram of the processing for deleting a distribution file in accordance with a particular implementation of an embodiment of the present invention. This action might be taken by the user who had registered a file with the RNS server, and who later wishes to recover storage space in the distribution file archive (214, FIG. 2) of her client system but does not want to de-register the file from the system. In a step, 1302, the user selects the distribution file to be deleted. The selection can be made by selecting any file link vis-á-vis its VRL that is associated with the distribution. The browser communicates a request to the server in a step 1304 to delete the distribution file associated with the file link specified in the VRL. The server retrieves the file properties of the selected file in a step 1306 and examines its access control list in a step 1308 to determine if the user has permission to perform the operation.

If it is determined in a step 1310 that the operation cannot be performed, then a reject response is communicated in a step 1312 to the browser. Otherwise, the server in a step 1314 modifies the entry in the file table corresponding to the file to indicate that the distribution file is no longer exists. For example, consider the particular implementation discussed above in connection with FIG. 3 where the cached user list 306 of the file table 300 simply lists all the users whose client systems have a physical copy of the file. By removing the user ID of the originating user of the file from this list, the RNS server will no longer select the originating user as a source of the file for subsequent download requests.

In a step 1316, the location of the client system on which the distribution file is stored is determined, and in a step 1318 a request to delete the distribution file from the client system. Step 1316 allows for a user other than the originating user of a distribution file to delete the file, so long as the access control list for that file permits such an action. Next, an acknowledge response is communicated to the client system that requested the file delete, in a step 1320. In response to the acknowledge response from the server, the client system updates its display to reflect the deleted file, in a step 1322.

Figure 14:
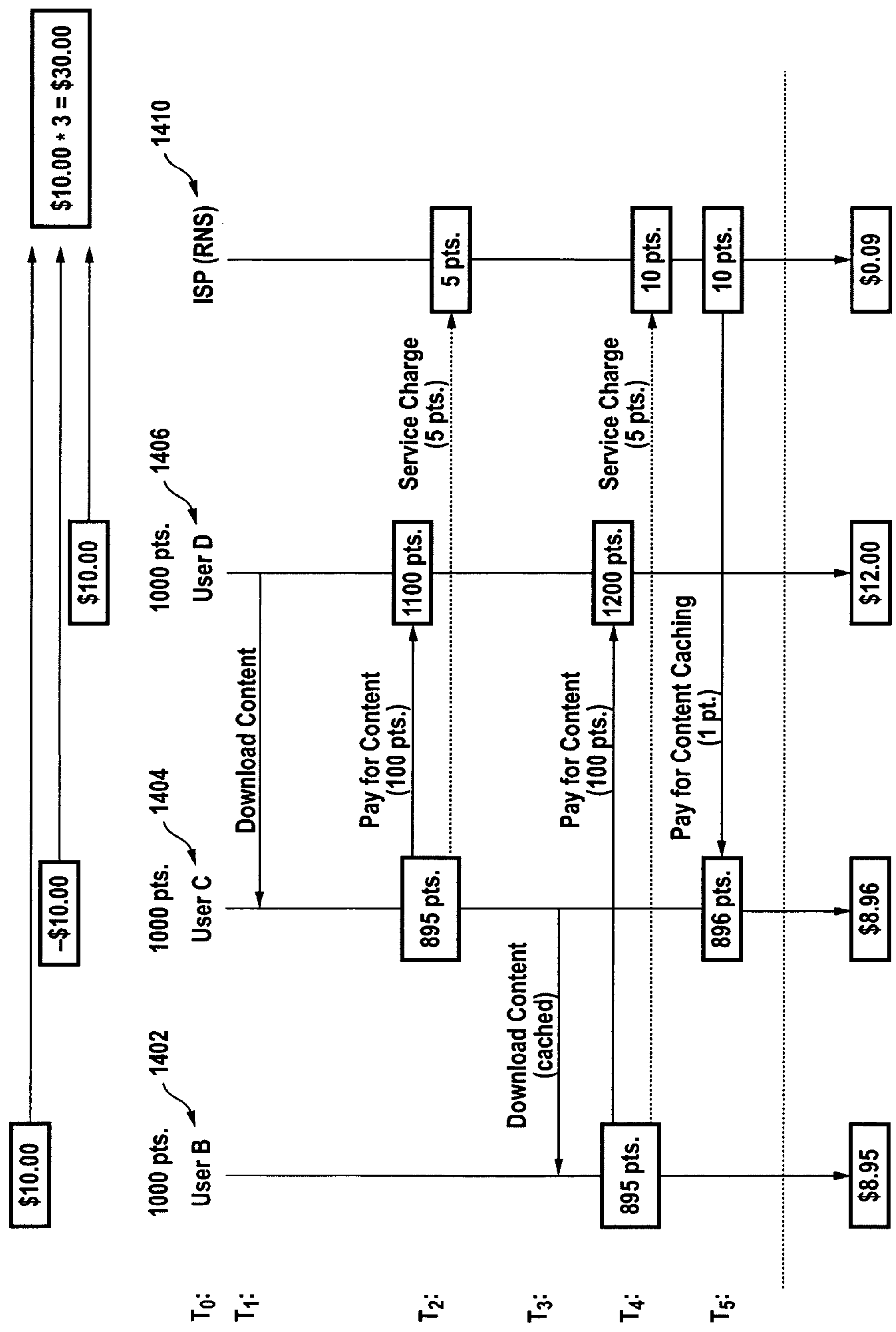
FIG. 14 shows an embodiment of the present invention as used in a content trading environment.

FIG. 14 shows a high level system diagram of a peer-to-peer file sharing system in a content trading service environment, in accordance with an embodiment of the present invention. An ISP (internet service provider) 1410 serves as a resource naming server (RNS). Client systems include users such as user_B 1402, user_C 1404, and user_D 1406. A content trading service is premised on the notion that a content originator produces digital work product that others desire to purchase. A factor which may motivate the content originator to produce her digital work product, of course, is the benefit of receiving compensation from those who would purchase her work. The ISP likewise is motivated to serve as an RNS in exchange for receiving compensation. It will become clear that a client system which has a copy of the digital work product cached in its cache file archive (216, FIG. 2) can be similarly motivated to provide access to potential purchasers of the work stored in its cache file archive.

In accordance with the present invention, users who desire to purchase digital content in the peer-to-peer system make a purchase of "points" from the ISP 1410. These points operate as currency in the system. At some initial time $T_0$, suppose that user_B and user_C wish to purchase digital content from the ISP which acts as the RNS. User_B and user_C each purchases 1000 points from the ISP for a certain amount of money.

Suppose further, at time $T_0$, that user_D is the content originator and that she registers her digital work product with the ISP; this action being performed in accordance with the process outlined in FIG. 8. This causes the digital work product to be copied into user_D's distribution file archive (214, FIG. 2).

Suppose at a time $T_1$ user_C has a desire to purchase the work of user_D. This action comprises performing a download of the work. In accordance with the process outlined in FIG. 6 for downloading files, the client system of user_C obtains a location address from the ISP indicative of where the file (user_D's digit work product) can be found. At this time, that location is user_D's client system. User_C downloads the work product from user_D into the cache file archive of user_C.

At a time $T_2$, when a successful download is determined, user_C submits a payment of points to user_D for her digital work product. User_C also submits a payment to the ISP as a service charge for providing access to the work product of user_D. Thus, in the example shown in FIG. 14, 100 points are "paid" to user_D and a service charge of five points is "paid" to the ISP. Payment can occur in any of a number of ways. For example, the ISP can provide an accounting mechanism which automatically credits and debits users' accounts with the appropriate "points" from a transaction.

Suppose now, at a time $T_3$, that user_B desires to purchase the digital work product of user_D. This action comprises performing a download of the work. In accordance with the process outlined in FIG. 6 for downloading files, the client system of user_B obtains a location address from the ISP indicative of where the file (user_D's digit work product) can be found. Now, the file is located in two places: user_D's distribution file archive and user_C's cache file archive. The ISP can return the location of either client system 1404 or 1406. The selection can be based on any suitable criteria. For example, if performance is an issue, then the ISP can provide the location of the client server that is closer to the user_B on the notion that the closer client system will provide a faster download. For the purpose of explaining this aspect of the present invention, suppose the ISP returns the location of user_C. User_B then downloads the work product from user_C's cache file archive into the cache file archive of user_B.

At a time $T_4$, when a successful download is determined, user_B submits a payment of points to user_D for her digital work product. User_B also submits a payment to the ISP as a service charge for providing access to the work product of user_D.

At a time $T_5$, the ISP submits a payment of points to user_C for providing access of user_C's cache file archive to others such as user_B. This payment to user_C is a motivating factor for user_C to serve as a content cache provider in the peer-to-peer file sharing system.

The ISP can redeem points from users who have unused points. Thus, if a user decides to leave the system, her unused points can be redeemed. As another example, if a user has accumulated some threshold number of points, the points can be redeemed. This would be especially suitable for the content originator, as a source of income for her work product.

It can be appreciated that the specific arrangements which have been described are merely illustrative of the many implementations in accordance with embodiments of the invention. Numerous modifications may be made by those skilled in the art without departing from the true spirit and scope of the invention as set forth in the following claims.

What is claimed is:

1. A peer-to-peer file sharing method for sharing a file between a plurality of client computers coupled to a server via a network, comprising steps of:

the server for peer-to-peer file sharing;

storing a first table which includes one or more relationships between file identification information which identifies the file, location information which indicates a client computer where the file is stored, and file access control information for the file;

storing a second table which includes one or more relationships between directory identification information which identifies a directory, directory content information which associates at least one file with the directory, and directory access control information for the directory;

and sending a plurality of directories to the plurality of client computers;

a first client computer sending a first request to associate a first file with a first directory;

the server receiving the first request from the first client computer;

the server determining whether the first file can be associated with the first directory based upon a first directory access control information;

if the first file can be associated with the first directory, then updating the second table to associate the first file with the first directory and sending by the server the first directory associated with the first file to the plurality of client computers;

a second client computer sending a second request to access the first file associated with the first directory to the server;

the server receiving the second request from the second client computer;

the server determining whether the first file can be downloaded to the second client computer based upon a first file access control information;

and if the first file can be downloaded by the second client computer, then sending by the server first location information which includes where the first file is stored to the second client computer and downloading by the second client computer the first file based upon the first location information;

the second client computer sending a third request to remove the first file from the first directory;

the server receiving the third request from the second client computer;

determining whether the association between the first directory and the first file can be removed;

if the association between the first directory and the first file can be removed, then deleting by the server the association between the first directory and the first file and providing by the server the first directory without association between the first directory and the first file to the second client computer;

determining whether there is an association between the first file and at least one of the plurality of directories;

and if there is no association between the first file and at least one of the plurality of directories, then sending by the server a fourth request to remove the first file in the first client computer to the first client computer.

2. A peer-to-peer file sharing method according to claim 1 wherein:

the file access information for the file includes authorization to access files, including reference operations and download operations; and the directory access control information for the directory includes authorization to access the directory, including association operations between a file and a directory.

3. A peer-to-peer file sharing method for sharing a file between a plurality of client computers coupled to a server via a network comprising steps of:

the server for peer-to-peer file sharing;

storing a first table which includes one or more relationships between identification information which identifies the file, location information which indicates where the file is stored in a client computer, and access control information for the file;

storing a second table which includes one or more relationships between a directory identification for a directory, the file associated with the directory, and directory access control information for the directory;

sending a plurality of directories to the plurality of client computers;

receiving a first request to associate a first file with a first directory from a first client computer;

and determining whether the first file can be associated with the first directory based upon a first directory access control information;

if the first file can be associated with the first directory, then updating the second table to associate the first file with the first directory and providing by the server the first directory to the plurality of client computers;

the server receiving a second request to download the first file from a second client computer;

the server determining whether the first file can be downloaded from the first client computer to the second client computer based upon a first file access control information;

and if the first file can be downloaded to the second client computer, then sending by the server a first location information which includes where the first file is stored to the second client computer;

receiving from the second client computer a third request to remove the first file from the first directory;

determining whether the association between the first file and the first directory can be removed based upon the first directory access control information;

if the association between the first directory and the first file can be removed, then removing by the server the association between the first file and the first directory from the first directory;

and sending by the server the first directory without the association between the first directory and the first file to the second computer;

determining whether there is an association between at least one of the plurality of directories and the first file;

and if there is no association with the first file, then sending by the server a fourth request to remove the first file from the first client computer to the first client computer.

4. The peer-to-peer file sharing method according to claim 3 wherein:

the file access control information for the file includes authorization for access to the files, including reference operations and download operations; and the directory access control information for the directory includes authorization for access to the directories, including association operations between the directory and the file.

* * * * *